United States Patent
Molisch et al.

(10) Patent No.: US 7,154,956 B2
(45) Date of Patent: Dec. 26, 2006

(54) OFDM RECEIVER FOR DETECTING FSK MODULATED SIGNALS

(75) Inventors: Andreas Molisch, Arlington, MA (US); Yves-Paul Nakache, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 740 days.

(21) Appl. No.: 10/624,771

(22) Filed: Jul. 22, 2003

(65) Prior Publication Data

US 2005/0018791 A1   Jan. 27, 2005

(51) Int. Cl.
*H04K 1/10*   (2006.01)
*H04L 27/14*   (2006.01)

(52) U.S. Cl. ...................................... 375/260; 375/334
(58) Field of Classification Search ................ 375/260, 375/269, 272–278, 323, 334–337; 329/300
See application file for complete search history.

(56) References Cited

U.S. PATENT DOCUMENTS

| | | | | |
|---|---|---|---|---|
| 6,438,173 | B1* | 8/2002 | Stantchev | 375/260 |
| 2004/0141548 | A1* | 7/2004 | Shattil | 375/146 |
| 2005/0117677 | A1* | 6/2005 | Sampath | 375/347 |

OTHER PUBLICATIONS

Van Nee et al., "*OFDM for Wireless Multimedia Communications*," Artech House, pp. 46-51, Jan. 2000.

* cited by examiner

*Primary Examiner*—Don N. Vo
(74) *Attorney, Agent, or Firm*—Dirk Brinkman; Clifton D. Mueller; Gene V. Vinokur

(57) ABSTRACT

An OFDM receiver detects FSK symbols in a communications network. An FFT has an input connected to receive temporal samples of a received, frequency-hopped FSK signal. Outputs of the FFT represent the FSK signal in a frequency domain. The outputs are grouped according to predetermined frequencies assigned by a transmitter of the FSK signal. An energy for each group of outputs is determined, and the energies of each group are then compared to recover a data stream from the FSK signal.

9 Claims, 3 Drawing Sheets

OFDM RECEIVER FOR DETECTING FSK MODULATED SIGNALS

RELATED APPLICATION

This application is related to U.S. patent application Ser. No. 10/624,690, "OFDM Transmitter for Generating FSK Modulated Signals" filed by Molisch and Nakache on Jul. 22, 2003, incorporated herein by reference.

FIELD OF THE INVENTION

The present invention relates generally to wireless communications, and more particularly to receiving FSK signals in ultra wide bandwidth communication systems.

BACKGROUND OF THE INVENTION

A number of possible modulation/multiple access schemes are considered for a physical layer of an ultra wide bandwidth (UWB) communications system by the IEEE 802.15.3a standards working group. One is multiband orthogonal frequency division multiplexing (OFDM).

As shown generally in FIG. 1, an OFDM transmitter sends data (OFDM symbols or 'blocks') 101 in parallel on K carrier frequencies ("tones") 102. Note that for multiband OFDM, all of the carrier frequencies are within one band. For example, in one proposal to the IEEE 802.15 standards working group, the 128 tones are spaced approximately 4 MHz apart, and have a duration of approximately 300 ns. Each of the tones is quaternary phase shift keying (QPSK) modulated.

In practice, OFDM signals are not demodulated by multiple parallel local oscillators for down conversion in an OFDM receiver. Rather, a fast Fourier transform (FFT) of the received signal is equivalent to the signal received on the individual tones. In a practical implementation, the FFT operates on a block of samples of the received signal, e.g., see May et al., "*Orthogonal Frequency Division Multiplexing,*" Part IV, Molisch (ed.), Wideband Wireless Digital Communications, Prentice-Hall, pp. 309–385, 2001. The FFT is typically implemented as a 'butterfly' structure, see, van Nee et al., "*OFDM for Wireless Multimedia Communications,*" Artech House, pp. 46–51, January 2000.

An alternative, less complex form of signaling is multiband frequency shift keying (FSK), i.e., FSK within each band. Although FSK has usually a lower data rate, and perhaps, a lower quality, FSK signaling is much simpler to implement, reducing the cost of the receiver.

However, providing FSK signaling as an alternative signaling mode to OFDM (so that either OFDM or FSK is allowed as transmit signal) has drawbacks for a standardized implementation. Now, the receiver is required to receive both high complexity OFDM signals and low-complexity FSK signals. That is, the receiver must include two different types of modulators, i.e., both OFDM and FSK. This increases the cost of the receiver.

It is desired to provide FSK reception with an OFDM transceiver without substantially increasing the cost.

SUMMARY OF THE INVENTION

An OFDM receiver detects FSK symbols in a communications network. An OFDM FFT has an input connected to receive temporal samples of a received, time-hopped FSK signal. Outputs of the FFT represent the FSK signal in a frequency domain.

The outputs are grouped according to predetermined frequencies assigned by a transmitter of the FSK signal. An energy for each group of outputs is determined, and the energies of each group are then compared to recover a data stream from the FSK signal.

DETAILED DESCRIPTION OF THE PREFERRED EMBODIMENT

The invention provides an OFDM receiver that can detect multiband FSK symbols. The received FSK symbols can be generated by a low-complexity, low-cost FSK transmitter or a complex OFDM transmitter. In other words, the invention enables a multiband OFDM receiver to detect multiband FSK symbols.

Figure 1:
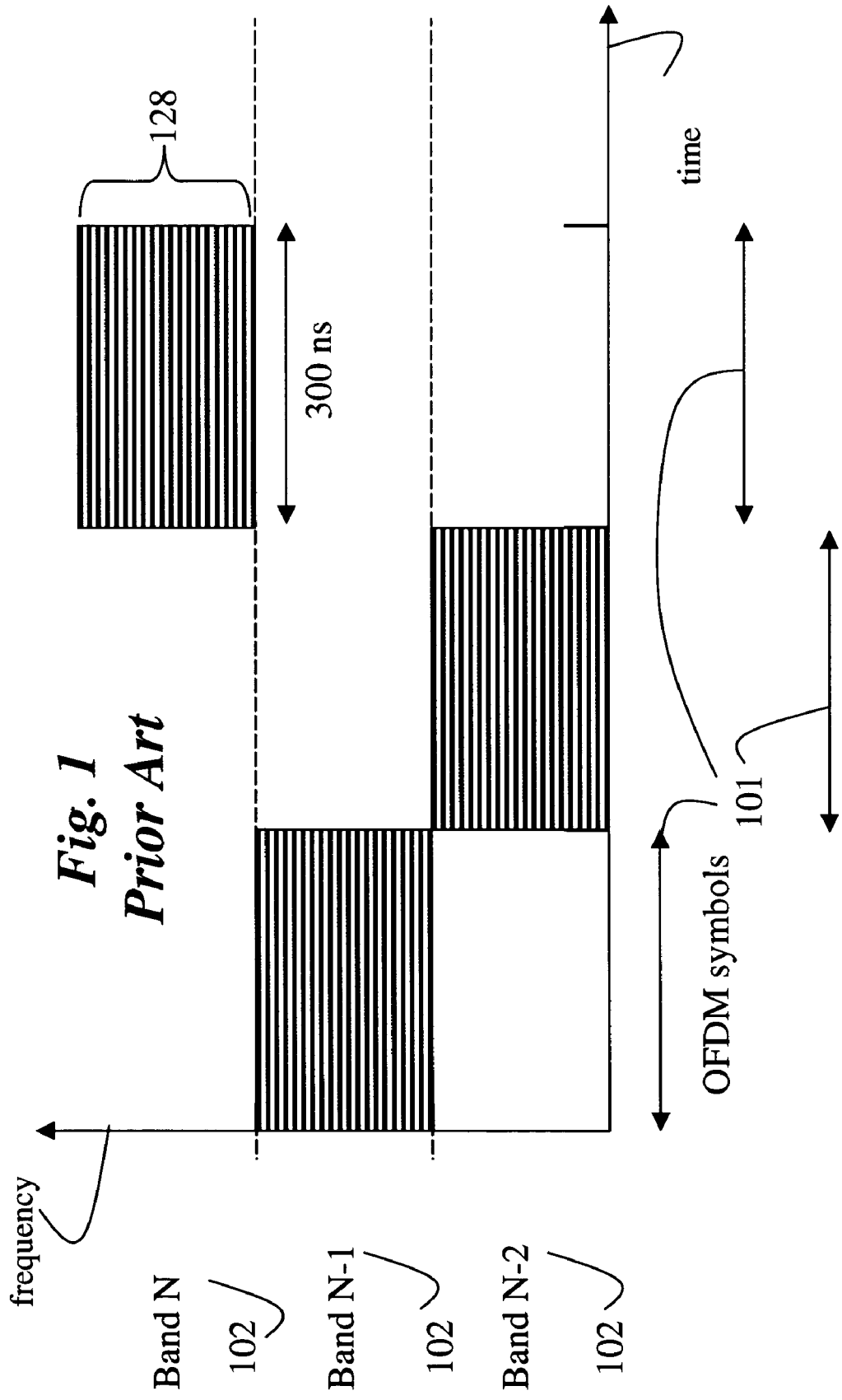
FIG. 1 is a time-frequency representation of a prior art multiband OFDM signal.
Figure 2:
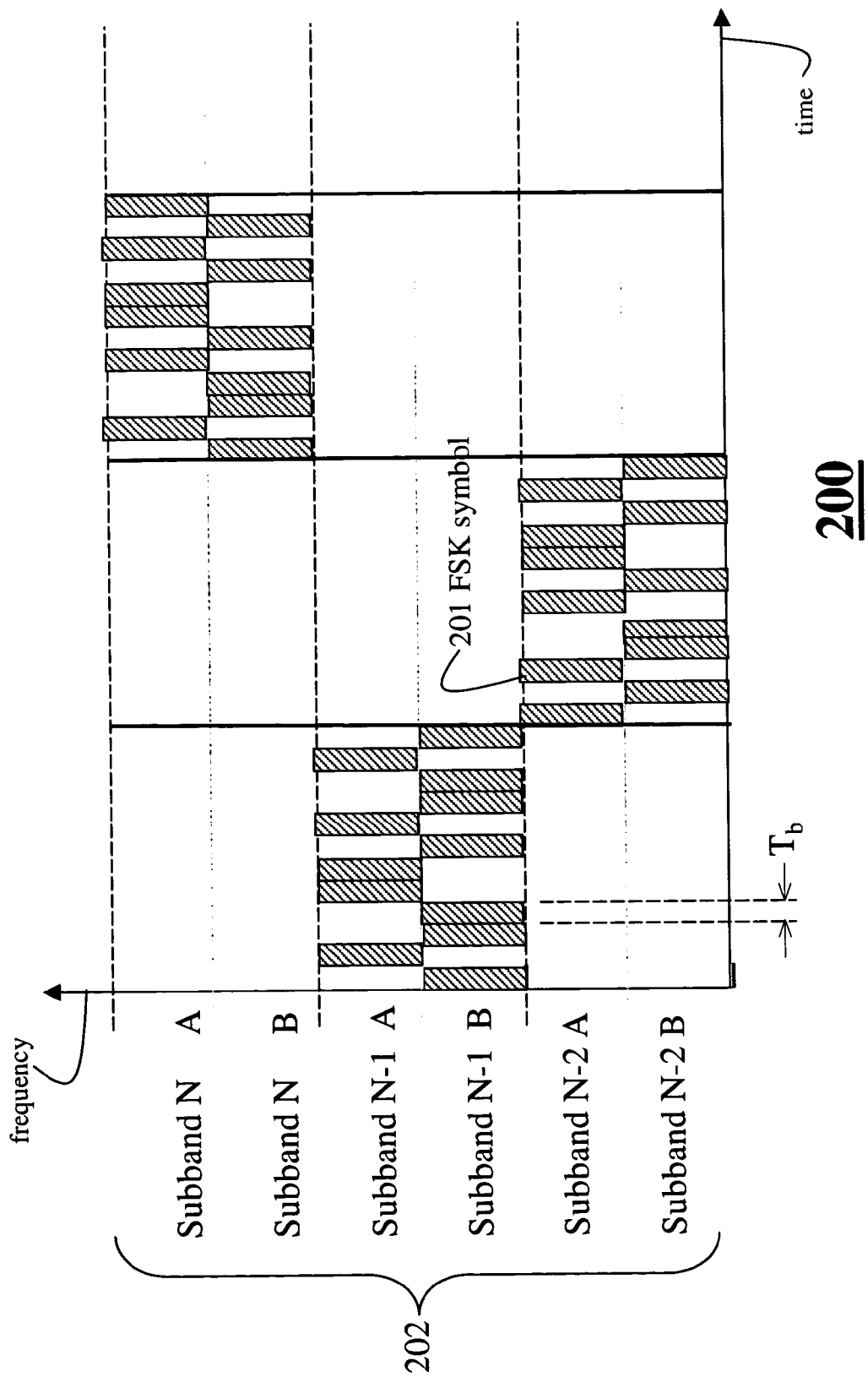
FIG. 2 is a time-frequency representation of multiband FSK.

In the preferred embodiment, as shown in FIG. 2, different groups of FSK symbols 201 are received in, perhaps, different bands of a large frequency range (bands N, N−1, N−2) 202. The number of symbols in each group can be one or larger. In the preferred embodiment, a duration $T_b$ of an FSK symbol is smaller or equal to the OFDM symbol duration for which the OFDM receiver is designed.

Figure 3:
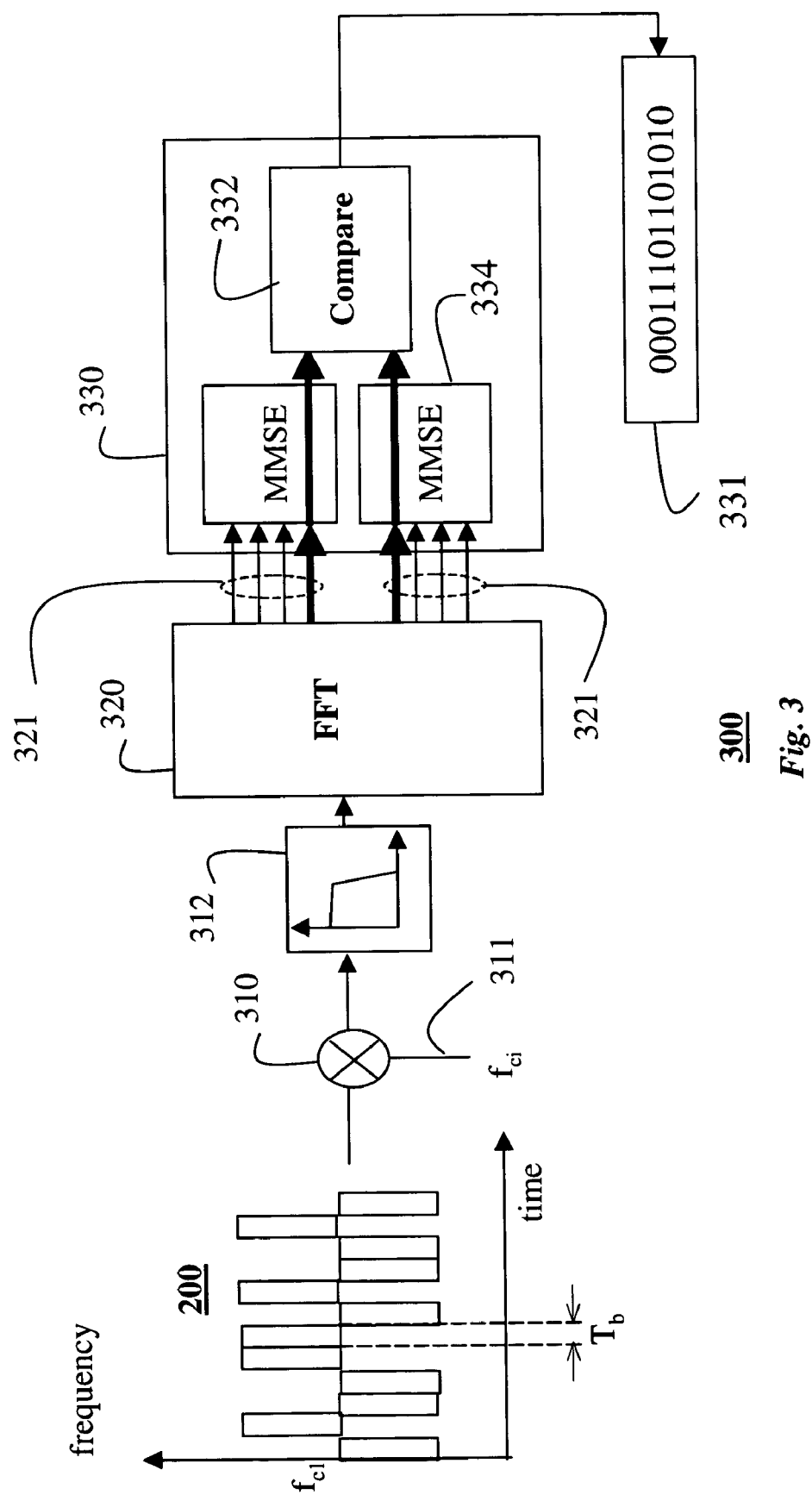
FIG. 3 is a block diagram of a multiband OFDM receiver detecting multiband FSK symbols using FFTs according to the invention.

FIG. 3 shows an OFDM receiver 300 according to the invention for detecting FSK symbols 200. A first step is the reversal of frequency hopping applied at the transmitter. This is achieved by multiplying 310 the received signal 200 by an output 311 of a local oscillator whose frequency $f_{ci}$ follows the transmitter frequency hopping pattern. This is a conventional technique.

After this step, the signal 312 is available in baseband or at an intermediate frequency, with a bandwidth equal to the bandwidth of one band. The sampled FSK signal 312 is demodulated by an OFDM demodulator, e.g., the FFT 320. The demodulated signals, if there are more than two, can be grouped 321, and a transmitted data stream 331 is detected 330 from the grouped signals. If there are only two outputs (fat lines), the energies can be compared directly.

The detection of the FSK symbols depends on various parameters. A signal constellation for M-ary FSK signaling. The number of frequencies M that indicate different symbols is important. A duration of each FSK symbol. A coherence bandwidth of the channel. A size of the FFT structure 310 and its clock frequency. These parameters are usually determined by factors not related to the FSK, but rather to the OFDM symbols for which the FFT structure 320 is intended.

However, these dependencies do not limit the scope of the invention. The invention applies to detecting any FSK signal with any OFDM demodulator and detector. By exploiting the characteristics of the FFT 310, the symbol duration can be adjusted and the bandwidths of the received signal, if necessary, can be grouped.

In a flat-fading channel with binary FSK, a duration of the FSK symbol is $T_b$. In this case, it is possible to detect the signal with a two-point FFT by setting the OFDM symbol duration to $T_b$. The outputs of the two-point FFT, fat lines only, correspond to the two frequency subbands that represent the transmitted data stream. Values +1 and −1 can be used for demodulation and detection. The detector 330 compares 332 energies of the outputs of the two tones directly.

If the duration $T_b$ of the FSK symbol is shorter than the duration of the OFDM symbol for which the FFT 320 is designed, then a switch or demultiplexer can be used to apply subsequent FSK symbols to different two-point FFTs. A typical FFT OFDM receiver includes multiple parallel and/or cascaded FFT stages of smaller size. Combinations of the stages are used for large-sized FFTs. The butterfly structure of the FFT is used to demodulate a binary FSK signal, where A and B are M, e.g. two, bands. Band A codes zeroes, and band B codes ones. When M-ary FSK is used, the size of the FFT is at least M. It is also possible to demodulate a combination of AM and FSK modulated signal.

When the channel exhibits frequency-selective fading, it is advantageous to use a larger-size FFT. In this case, the spacing of the OFDM tones is at most a coherence bandwidth of the channel as each tone undergoes a different attenuation and phase shift in the channel. In this case several tones are contained within each subband.

The receiver then groups 334 and compares 332 grouped outputs to detect the data stream 331. The combining can linearly weigh the tones before they are combined. The weights can be determined 334, for example, from a minimum mean square error (MMSE) criterion. The combining can use information about a state of the channel gathered during a training sequence and perform a joint channel state/information detection processing. Alternatively, the combining can use incoherent or differentially coherent detection.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An OFDM receiver for detecting FSK symbols in a communications network, comprising:
    an OFDM demodulator having an input connected to receive temporal samples of a received FSK signal, and outputs representing the FSK signal in a frequency domain;
    means for determining an energy for the outputs; and
    means for comparing the energies of each output to recover a data stream from the FSK signal.

2. The receiver of claim 1, further comprising:
    means for grouping the outputs according to predetermined frequencies assigned by a transmitter of the FSK signal, and in which the determining and comparing operates on groups of outputs.

3. The receiver of claim 2, in which the FSK signal is transmitted by an OFDM transmitter.

4. The receiver of claim 1, in which a duration of an FSK symbol is equal to a duration of an OFDM symbol.

5. The receiver of claim 1, in which a duration of an FSK symbol is less than a duration of an OFDM symbol.

6. The receiver of claim 1, in which a number of outputs of the OFDM demodulator is two for binary FSK.

7. The receiver of claim 2, in which the outputs are linearly weighed.

8. The receiver of claim 7, in which the weighing uses a minimum mean square error criterion.

9. A method for detecting FSK symbols in a communications network, comprising:
    an OFDM demodulating an input connected to receive temporal samples of a received FSK signal, and outputs representing the FSK signal in a frequency domain;
    determining an energy for the outputs; and
    comparing the energies of each output to recover a data stream from the FSK signal.

\* \* \* \* \*